United States Patent Office 3,480,616
Patented Nov. 25, 1969

3,480,616
ESTERIFICATION OF POLYHYDRIC COMPOUNDS IN THE PRESENCE OF TRANSPARENT EMULSIFYING AGENT
Lloyd I. Osipow, New York, and William Rosenblatt, Spring Valley, N.Y., assignors to The State of Nebraska, Lincoln, Nebr.
No Drawing. Continuation-in-part of application Ser. No. 540,505, Apr. 6, 1966. This application Mar. 21, 1967, Ser. No. 624,718
Int. Cl. C07c 67/00, 69/32, 69/30
U.S. Cl. 260—234
10 Claims

ABSTRACT OF THE DISCLOSURE

This invention relates to an improved process for the synthesis of organic compounds where the reactants are insoluble or only slightly soluble in each other. Such process involves forming a transparent emulsion containing immiscible reactants and maintaining the transparent emulsion under appropriate conditions to permit the reaction between the immiscible reactants to take place.

This application is a continuation-in-part of U.S. application Ser. No. 540,505, filed Apr. 6, 1966, and now abandoned.

The process of this invention is particularly applicable to the production of nonionic surface-active agents, where one reactant is predominantly hydrophobic and the other is predominantly hydrophilic. Examples of such nonionic surface-active agents that can be readily produced using the process of this invention are the glyceryl, sucrose and raffinose esters of long-chain fatty acids, such as glyceryl monostearate, sucrose monooleate, sucrose disterate and raffinose dioleate.

Objects and advantages of the invention will be set forth in part hereinafter and in part will be obvious herefrom, or may be learned by practice with the invention the same being realized and attained by means of the steps and methods pointed out in the appended claims.

The invention consists in the novel steps and methods herein shown and described.

An object of this invention is to provide an improved organic synthesis process.

A further object of this invention is to provide an improved organic synthesis process for conducting a reaction between two immisicble reactants.

Another object of this invention is to provide a process for the synthesis of organic compounds which avoids the use of toxic and expensive solvents. For example, in the manufacture of the sucrose esters of long-chain fatty acids (12–22 carbon atoms) the practice has been to use a mutual solvent for sucrose and the methyl esters of these fatty acids. Suitable solvents include dimethylformamide, formamide and dimethylsulfoxide. Commercialization of these sucrose esters has been limited in part because losses of these expensive solvents during processing add substantially to the manufacturing costs, and in part because traces of solvent remain in the sucrose ester products so that they are not suitable for use as food emulsifiers.

A further object of this invention is to provide an organic synthesis which is not limited by the degree of solubility of one reactant in the other. An example relates to the manufacture of glyceryl monostearate. The reaction is generally carried out by heating glycerine with a triglyceride and a catalyst at 200–250° C. Glycerine is essentially insoluble in the triglycerides of long-chain (12–22 carbon atoms) fatty acids at room temperature, but the solubility increases as the temperature is raised. At somewhat higher temperatures than 200–250° C., there is excessive decomposition of glycerine. This reaction proceeds to equilibrium and the product is a mixture of monoglycerides, diglycerides and triglycerides. The more glycerine that is dissolved in the triglyceride, the greater is the proportion of monoglyceride formed. Because of limitations concerning the amount of glycerine that can be dissolved, the product of the reaction generally contains only about 50 percent of monoglycerides. In contrast, about 75 percent of monoglycerides can conveniently be obtained with our process.

Still further objects of this invention are to provide an improved organic synthesis for the production of products in high yields, at low cost and without excessive degradation of the reactants.

It has been found that the objects of this invention may be realized by forming a transparent emulsion containing immiscible reactants and maintaining the transparent emulsion under appropriate conditions to permit the reaction between the immiscible reactants to take place. The term transparent emulsion as used herein refers to the fact that the diameter of the droplets of the dispersed phase is less than one-quarter of the wavelength of light. As a consequence of the small size of the droplets, the emulsion is transparent. It may be noted that transparent emulsions containing large droplets of the dispersed phase may also be prepared using immiscible liquids that have the same refractive index. However, the use of such emulsions is not contemplated in the practice of this invention. An essential requirement of our organic synthesis process is the small size of the emulsified droplets.

The systems used in the practice of this invention may be called either transparent emulsions or microemulsions. Both terms refer to emulsions with droplet diameters less than one-quarter of the wave-length of light. The systems may also be referred to as solubilized systems. According to this concept, the emulsifying agent which is used to form the transparent emulsion or solubilized system is present in the form of submicroscopic clusters called micelles, and the internal phase is dissolved or solubilized within the micelles. We do not know of any way to distinguish between a microemulsion or one in which the internal phase is solubilized within micelles. The difference is probably entirely academic.

There are a number of publications that discuss the theory and the conditions under which transparent emulsions form. In all of these references water is used as one phase of the emulsion. Generally, we do not employ water in our process. These references are: J. H. Schulman and J. B. Montagne, Ann. N.Y. Acad. Sci., 92 (Article 2), 366 (1961); J. E. Bowcott and J. H. Schulman, Z. Elektrochem, 59, 283 (1955); J. H. Schulman, W. Stoeckenius, and L. M. Prince, J. Phys. Chem. 63, 1677 (1959); L. I. Osipow, J. Soc. Cosmetic Chemists, XIV, 277 (1963).

We are not aware of any instance prior to this invention in which an essentially anhydrous transparent emulsion has been prepared. Similarly, we are not aware of any previous instance in which a transparent emulsion has been formed in order to carry out an organic reaction.

In order to conduct a reaction between two immiscible liquid reactants, we combine the reactants in the presence of a suitable emulsifying agent to form a transparent emulsion. The reaction is then carried out in the same manner as would be used if the reactants were miscible or if they were dissolved in a mutual solvent. Thus, a catalyst may be added and heat may be supplied to speed the reaction. Reaction rates are of the same general order in transparent emulsions as in homogeneous solution reactions. In contrast, reactions involving immiscible reactants that are conducted in conventional opaque emulsions are generally far too slow to be practical.

The diameter of the dispersed droplets in conventional opaque emulsions is usually several microns, or in the order of 100 times larger than the droplets in transparent emulsions. Reactions between reactants that are located entirely in the different phases of the emulsions can only occur at the interface formed by the droplets and the continuous phase. The fact that only a very small proportion of the reactant molecules of the dispersed phase is present at the interface in a conventional opaque emulsion, as compared with a transparent emulsion, helps to explain why the reaction rates are so slow in opaque emulsions and why reaction rates are so much more favorable able in the case of transparent emulsions.

Instead of forming a transparent emulsion directly with the reactants, we may dissolve the reactants in separate solvents to obtain two immiscible solutions which are then emulsified to form a transparent emulsion.

There are also instances in which one of the reactants is a solid that cannot be melted without decomposition and in which the only practical solvent will compete in the reaction. A case in point is the transesterification reaction between sucrose and an ester of a long-chain fatty acid, such as methyl stearate. Water cannot be used as the solvent for sucrose, since it will inhibit the reaction. Solvents such as pyridine and dimethylformamide are somewhat toxic. Suitable solvents for sucrose that are nontoxic are alcohols such as propylene glycol, butylene glycol and glycereine. However, they compete with the dissolved sucrose in the transesterification reaction. We have discovered that we can conduct the reaction between sucrose and an ester of a long-chain fatty acid by first dissolving the sucrose in propylene glycol, for example, and forming a transparent emulsion between this solution and the ester of the fatty acid. We then distill off the propylene glycol and recover the sucrose ester of the fatty acid. There is strong presumptive evidence that a microdispersion of the sucrose forms during the distillation of the propylene glycol, since the sucrose ester cannot be formed in any significant amount by simply dispersing finely ground sucrose in the reaction mixture in the absence of the solvent for sucrose.

Thus, an essential feature of the process is the formation of a transparent emulsion. In some instances it is also necessary to distill off the solvent that has been added to dissolve one of the reactants, and in so doing form a microdispersion of that reactant in the remainder of the reaction mixture.

As stated above, the theoretical conditions for the formation of transparent emulsions are well known. In general, from 10 to 40 percent of emulsifying agents are required for the formation of a transparent emulsion. Any of a large variety of emulsifying agents, alone or in combination, can be used to form transparent emulsions. These include ethylene oxide condensation products formed from lanolin alcohol, from 12 to 22 carbon atom fatty acids, fatty alcohols and fatty amines; sorbitan esters of 12 to 22 carbon atom fatty acids and their ethylene oxide derivatives; 12–22 carbon atom alkyl sulfates and phosphates; 12 to 22 carbon atom alkyl sulfonates; 12 to 22 carbon atom alkenyl sulfonates; alkylbenzene sulfonates with 8 to 18 carbon atoms in the alkyl group; surface-active quaternary ammonium compounds; and, the sodium and potassium soaps of 12 to 22 carbon atom fatty acids. The specific emulsifying agent or combination of agents that will produce a transparent emulsion will depend upon the composition of the two liquid phases and the reaction conditions. Of course, in carrying out the process, care should be exercised so that suitable conditions such, for example, as a suitable temperature, are employed not only in forming the transparent emulsion, but also maintaining it during the reaction period.

An additional factor is that the product of the reaction is most often a surface-active agent with emulsifier properties. As product is formed the total content of emulsifier in the system is increased and this tends to stabilize the transparent emulsion. It is often found that a somewhat turbid emulsion will become transparent a short time after the reaction has started.

We may select our emulsifying agent on the basis of the ease with which it can be separated from the product. Sodium and potassium soaps are particularly preferred for this reason. They can be readily removed by the use of ion-exchange resins, they are insoluble in many organic liquids that are solvents for the products formed in these reactions, and they can easily be converted to fatty acids which have entirely different solubility characteristics from the soaps. Further, they are inexpensive and nontoxic.

We may also select the emulsifying agent on the basis of the end use of the product, thus avoiding any need to separate the reaction product from the emulsifier used to form the transparent emulsion. Thus, for detergent applications, we may use sodium alkylbenzene sulfonate in producing a sucrose ester, since the product after compounding with conventional builders is a good low-cost detergent. Alternatively, sodium tallow sulfate may be used in the production of a sucrose ester, because the combination after compounding is an excellent biodegradable detergent. For cosmetic applications, an ethylene oxide condensation product of lanolin alcohol may be used as the emulsifier in the preparation of sucrose esters.

Special mixing equipment is not required to form a transparent emulsion. All that is necessary is to combine the liquid phases with the emulsifying agent and heat to the appropriate temperature using high-speed or moderate-speed mixing.

Examples of the types of products that can advantageously be manufactured using the transparent emulsion process of this invention include the esterification products of long-chain fatty acids with glycerine and sucrose. The following examples illustrate the invention, but are not self-limiting.

EXAMPLE 1

This example illustrates the reaction between glycerine and methyl oleate to form glyceryl oleate. In this instance, an emulsifying agent was not included in the reaction mixture and a transparent emulsion was not formed. Instead, the reactants were maintained in the form of a crude emulsion by vigorous stirring.

A mixture of glycerine (100.0 g., 1.09 mole) and methyl oleate (100.0 g., 0.34 mole) was added to a three necked flask equipped with a thermometer, motor driven stirrer, and an adapter for vacuum. The mixture was heated with stirring for two hours at 110° C./5 mm. Hg to remove any water that might be present. The vacuum was then momentarily released and 0.2 gram of sodium methoxide was added. The reaction was maintained at 110° C./5 mm. Hg for three additional hours. At the completion of the reaction time when stirring was halted, the reactants separated into two liquid phases. The lower layer was essentially unreacted glycerine.

A sample of the upper layer was dissolved in ethyl ether and was washed repeatedly with water to remove any glycerine present. The ether extracts were dried over anhydrous sodium sulfate and the ether was removed by distillation. This fraction had a hydroxyl number of 3.0, showing that very little glyceryl oleate had formed.

EXAMPLE 2

This reaction was identical to that described above, except that sodium oleate (30.4 g., 0.10 mole) was added to the initial mixture of glycerine and methyl oleate. Shortly after the reaction was started, a transparent emulsion formed. This was observed by stopping the agitation. The mixture was a clear, homogeneous single liquid phase, as judged by visual observation. After completion of the reaction and cooling to room temperature, the reaction mixture appeared as a slightly turbid, but otherwise homogeneous, gel.

A portion of the product was analyzed, using the same procedure used in Example 1. The ether-soluble fraction was found to have a hydroxyl number of 219.2.

The amounts of glyceryl monooleate and glyceryl dioleate in the product can be calculated approximately from the equation:

$$315X + 90.5(1-X) = \text{hydroxyl number found}$$

where 315 is the hydroxyl number of pure glyceryl monooleate, 90.5 is the hydroxyl number of pure glyceryl dioleate, X is the weight fraction of monoglyceride in the sample, and $1-X$ is the weight fraction of diglyceride in the sample. Based on this equation, the product of this reaction consisted of a mixture of 57.4% of glyceryl monooleate and 42.6% of glyceryl dioleate.

EXAMPLE 3

A mixture of glycerine (110.0 g., 1.09 mole), corn oil (largely triolein 97.4 g., 0.11 mole), and sodium oleate (40.0 g., 0.13 mole) was reacted as described under Example 2. The reaction was allowed to proceed for 7½ hours after the addition of 0.2 grams of sodium methoxide following the removal of water. A transparent emulsion formed early in the reaction. The hydroxyl number of the ether-soluble reaction product was 236.0 (calculated to be a mixture of 64.9% mono and 35.1% diglycerides).

EXAMPLE 4

A reaction was conducted identical to Example 3, except that sodium stearate was used instead of sodium oleate to yield a reaction product with a hydroxyl number of 243.6 (calculated to be a mixture of 68.5% mono and 31.5% diglycerides).

EXAMPLE 5

A number of additional Examples 5A–5P, respectively, of reactions between glycerine and esters of fatty acids are shown on Table I. In all of these examples, a transparent emulsion formed during the early stages of the reaction. In several of the examples, no catalyst was added. The soap used to form the emulsion provided sufficient alkalinity to catalyze the reaction.

Hydroxyl numbers shown on the table were obtained on the dry diethyl ether extract, after first washing the ether layer 10 or 12 times with water to remove unreacted glycerine.

EXAMPLE 6

The reaction product of Example 5O was recovered by the following procedure. A portion, 50 grams, of the reaction mixture was dispersed in 200 ml. of hot n-hexane. Sufficient concentrated HCl was added to convert the sodium oleate present to oleic acid. The mixture was then centrifuged at 2500 r.p.m. for 5 minutes. The hexane supernatant liquid contained oleic acid and was removed. The hexane-insoluble fraction was heated briefly at 100–125° C., where it separated into two layers. The lower layer was essentially glycerine and weighed 26.3 grams. The upper layer consisted of the mixed glyceride product, which weighed 14.4 grams and melted in the range of 54–57° C. This glyceride fraction was recrystallized from n-hexane and found to have a hydroxyl number of 245.0 and an acid number of 2.4.

EXAMPLE 7

The reaction product of Example 5H was purified by first dissolving 25 grams of the reaction mixture in a solvent mixture consisting of 100 ml. of diethyl ether and 50 ml. of 95% ethyl alcohol. The solution was poured into a separatory funnel, 150 ml. of water was added plus sufficient diethyl ether to equalize the volumes of the two phases.

The aqueous phase was drawn off and washed with additional diethyl ether. The ether phase was rewashed with fresh water. The ether fractions were combined, dried over anhydrous sodium sulfate, and the solvent was removed on the steam bath. The product was dried in an oven at 55° C. for 48 hours. Approximately 8.2 grams of a semi-solid glyceride mixture (hydroxyl number 227.7) was obtained.

EXAMPLE 8

This example illustrates the preparation of sucrose monostearate by the procedure involving the initial formation of a transparent emulsion. A mixture of 400 g. (5.25 mole) propylene glycol, 53 g. (0.17 mole) sodium oleate, 136.9 g. (0.40 mole) sucrose and 39.5 g. (0.13 mole) methyl stearate was placed into a three-necked flask equipped with thermometer, motor driven stirrer, heating mantle, and fractionating column. The latter was connected to a water cooled condenser which was attached to a collecting flask fitted with an outlet for a vacuum source. The reaction mixture was heated at atmospheric pressure to approximately 130° C. with constant agitation. A transparent emulsion formed. The heat

TABLE I.—EXAMPLES 5A-5P

| Glycerine (Moles) | Ester (Moles) | Ester, Type | Soap (Emulsifier) Moles | Soap, Type | Catalyst | Reaction Conditions Temperature and Vacuum | Reaction Time (hours) | Hydroxyl No. of Product | Monoglycerides Percent | Diglycerides Percent |
|---|---|---|---|---|---|---|---|---|---|---|
| 1.08 | 0.33 | Methyl oleate | 0.13 | Sodium oleate | 0.1% Sodium methoxide | 110° C./5mm | 5¾ | 210.6 | 53.7 | 46.3 |
| 1.08 | 0.33 | do | 0.06 | do | do | 110° C./5 mm | 5¾ | 220.3 | 57.8 | 42.2 |
| 1.08 | 0.33 | do | 0.06 | do | do | 110° C./5 mmg | 6 | 230.2 | 62.1 | 37.9 |
| 1.08 | 0.33 | do | 0.06 | do | do | 110° C./5 mm | 7½ | 228.5 | 61.5 | 38.5 |
| 1.08 | 0.33 | do | 0.06 | do | 0.2% Sodium methoxide | 110 C./5 mm | 7 | 215.8 | 56.1 | 43.9 |
| 1.63 | 0.25 | do | 0.10 | do | 0.1% Sodium methoxide | 110° C./5 mm | 5½ | 254.0 | 73.1 | 26.9 |
| 1.63 | 0.08 | Glyceryl trioleate | 0.13 | do | None | 110° C./5 mm | 6 | 256.2 | 73.8 | 26.2 |
| 1.63 | 0.08 | do | 0.13 | do | do | 125° C./2 mm | 6 | 250.9 | 71.7 | 28.3 |
| 1.56 | 0.04 | do | 0.14 | do | do | 110° C./5 mm | 6 | 263.7 | 77.2 | 22.8 |
| 1.08 | 0.11 | do | 0.13 | Sodium stearate | 0.1% Sodium methoxide | 110° C./5 mm | 6 | 243.6 | 68.5 | 31.5 |
| 1.08 | 0.11 | do | 0.06 | Sodium oleate | do | 110° C./5 mm | 6 | 219.9 | 57.8 | 41.2 |
| 1.63 | 0.08 | do | 0.13 | do | 0.1% Potassium carbonate | 110° C./5 mm | 6 | 258.2 | 74.9 | 25.1 |
| 1.63 | 0.08 | do | 0.26 | do | None | 110° C./5 mm and then 125° C./2 mm | 2½ 3½ | 258.9 | 75.0 | 25.0 |
| 1.63 | 0.08 | do | 0.13 | Sodium stearate | do | Same as Example M | | 249.1 | 70.7 | 29.3 |
| 3.26 | 0.17 | Glyceryl tristearate | 0.26 | Sodium oleate | do | 140° C./3 mm | 6 | 257.7 | 74.5 | 25.5 |
| 3.26 | 0.17 | Glyceryl trioleate | 0.26 | Sodium stearate | do | 175° C./3 mm | 6 | 250.2 | 71.1 | 28.9 | input was reduced and trace moisture was removed along with approximately 10% of the propylene glycol by distilling at 95–100° C./70 mm. Hg over a period of 1 to 1½ hours. The heat and vacuum were then momentarily stopped and 0.65 gram of anhydrous potassium carbonate (0.1% by weight) was added to the reaction mixture. The reaction was then continued at 110° C. under reduced pressure for approximately 5 hours until essentially all of the propylene glycol was removed. Near the end of the reaction the distillation proceeded at approximately 1 mm. Hg. The pot temperature increased rapidly at the end of the distillation and was allowed to reach 150° C. before heating was discontinued. The reaction products were allowed to cool under reduced pressure.

A portion of the product was fractionated to recover the sucrose stearate by washing 50 grams with three 200 ml. portions of hot n-hexane. The hexane solution was evaporated to give 15.8 grams of dry solids. Analysis of this fraction by optical rotation in dry n-butanol gave a value corresponding to 53.7% sucrose monostearate. The fraction recovered as hexane insolubles weighed 33.1 grams. Analysis of this fraction showed that it contained 4.1% of sucrose stearate, calculated as sucrose monostearate.

EXAMPLE 9

This example illustrates the preparation of sucrose monostearate by the procedure involving the initial formation of a transparent emulsion. A mixture consisting of 900 ml. of propylene glycol, 308.4 g. (0.90 mole) of sucrose, 180.0 g. (0.60 mole) of methyl stearate, and 165.0 g. (0.54 mole) of sodium stearate was placed in a two-liter resin kettle fitted with a thermometer, stirrer, and water-jacketed condenser connected to a receiver which lead to a vacuum source.

The mixture was heated with stirring to 130–135° C. In this temperature range the sugar dissolved completely and the reaction mixture was clear and homogeneous. Vacuum was applied and the propylene glycol was distilled. It was necessary to gradually increase the temperature during the distillation of the glycol. Otherwise turbidity develops and the reaction does not go to completion. Turbidity was first observed after 30 to 40% of the glycol was distilled. On raising the temperature, the emulsion clarified at 145–150° C./130–140 mm. Hg. In the final stage of distillation, the glycol was completely removed at 165–167° C./3–4 mm. Hg. The reaction mass was removed from the kettle while it was still fluid. At room temperature, it was friable and could be easily crushed and ground.

EXAMPLE 10

The pulverized reaction products of Example 9, 100 g., were heated to 60° C. with 400 ml. of methyl ethyl ketone and filtered through a heated Büchner funnel. The filter cake was washed with an additional 300 ml. of methyl ethyl ketone. Practically all of the unreacted sucrose and approximately 60% of the sodium stearate initially present were recovered as the filter cake.

The combined methyl ethyl ketone solution was adjusted with concentrated hydrochloric acid to pH 6, to neutralize the remainder of the soap present. It was then cooled to 20° C., filtered, and washed with additional methyl ethyl ketone. The filter cake, after drying to remove solvent, consisted of 45 g. of sucrose ester and about 2 g. each of salt and occluded stearic acid. Analysis of the sucrose ester showed a 1.15 to 1.0 molar ratio of stearyl groups to sucrose.

EXAMPLE 11

Sucrose dioleate was prepared using the same procedure as in Example 9, except that a lower ratio of sucrose to methyl ester was employed in the reaction mixture. This consisted of 0.18 mole of sucrose, 0.20 mole of methyl oleate, 0.13 mole of sodium oleate, 2.63 mole of propylene glycol, and 0.05% of sodium methoxide catalyst. After initial stripping to remove trace water, the catalyst was added and the reaction was continued at 130° C./3 mm. Hg. After 3½ hours, all of the propylene glycol was distilled.

A portion of the material, after completion of the reaction, was extracted with dry n-butanol and filtered. The sucrose oleate dissolved in the butanol solution was hydrolyzed with alcoholic KOH to release sucrose, which precipitated from the solution. It was recovered and analyzed for sucrose by optical rotation in water. The fraction consisting of unreacted sucrose and soap that was not dissolved by n-butanol in the extraction was also analyzed for sucrose by optical rotation in water. The sum of esterified sucrose recovered by hydrolysis of the butanol solubles and unreacted sucrose was in excellent agreement with total sucrose present in the sampling taken for analysis. All oleate ester was present in the butanol extract. This analysis showed that the product contained sucrose oleate in the ratio of 1 mole of sucrose to 2.1 moles of the oleate group.

EXAMPLE 12

Sucrose monooleate was prepared using essentially the same procedure as in the previous example. The reaction mixture consisted of 0.3 mole of sucrose, 0.1 mole of methyl oleate, 0.13 mole of sodium oleate, 3.94 moles of propylene glycol, and 0.1% of sodium methoxide catalyst. The mixture was heated to 140° C. under slight vacuum to dissolve the sucrose and obtain a transparent emulsion. The temperature was dropped to 110° C./90 mm. Hg. to remove traces of water and about 10% of the propylene glycol. The catalyst was added and the reaction was conducted for 5 hours, finishing at 160° C./1 mm. Hg. to remove essentially all of the propylene glycol. The product was analyzed using the same procedure as in Example 10. Analysis showed that the product contained sucrose and oleate groups in. The ratio of 1 mole of sucrose to 1.19 moles of the oleate group.

EXAMPLE 13

Sucrose laurate was prepared from a transparent emulsion reaction mixture using the same general procedure described in the previous example. A mixture of 400 g. (5.25 mole) propylene glycol, 39.4 g. (0.13 mole) sodium oleate, 136.9 g. (0.40 mole) sucrose, and 28.5 g. (0.12 mole) methyl laurate, was heated to 130° C. to obtain a transparent emulsion. The temperature was reduced to 110° C./80 mm. Hg. to remove traces of water and approximately 10% of the glycol. The catalyst, 0.60 g. (0.1%) of sodium methoxide, was then added and the reaction was continued for 7 hours, finishing at 135° C./2 mm. Hg to remove essentially all the propylene glycol. The product was analyzed by the same procedure as in Example 10. The analysis showed that the product contained sucrose and laurate groups in the ratio of 1 mole of sucrose to 1.24 moles of the laurate group.

EXAMPLE 14

A series of experiments were conducted for the purpose of selecting emulsifying agents that form transparent emulsions with a mixture of methyl laurate, sucrose, and propylene glycol. Potassium carbonate was included in the mix to provide alkalinity for the alcoholysis reaction. The composition, which contained a 1.5 to 1.0 molar ratio of sugar to methyl laurate, was as follows:

Sucrose _____grams__ 43.1
Methyl laurate _____do____ 18.2
Potassium carbonate _____do____ 0.11
Propylene glycol _____ml__ 126

The emulsifier was added, and the composition was heated in a beaker to 155° C., with observations taken as to whether a transparent emulsion formed during heating. Transparent emulsions were obtained with cationic, anionic, and nonionic emulsifying agents. Relatively high concentrations of emulsifying agents were used in these tests, and it is possible that transparent emulsions would also have formed with lower concentrations. Emulsifiers that gave transparent emulsions are shown below, along with the emulsifier used, expressed as a percentage of total solids, i.e., the total composition including emulsifier less propylene glycol.

| Emulsifiers that produced transparent emulsions: | Concentration as percent of total solids |
|---|---|
| Cetyl pyridinium chloride | 27.4 |
| Distearyl dimethyl ammonium chloride | 21.5 |
| Potassium α-sulfostearate | 27.4 |
| Sodium cetyl sulfate [1] | 27.4 |
| Sodium octadecyl sulfonate | 36.1 |
| Sodium dodecylbenzene sulfonate | 33.7 |
| Sodium stearate | 27.4 |
| Hydrogenated tallow amide ethoxylated with 5 moles of ethylene oxide | 27.4 |
| Glyceryl monostearate | 36.1 |
| Lanolin alcohol ethoxylated with 40 moles of ethylene oxide | 27.4 |

[1] 75% sodium cetyl sulfate, 25% sodium stearyl sulfate.

EXAMPLE 15

Emulsifying agents were combined with methyl stearate, sucrose and propylene glycol and heated in an open beaker, generally to 155° C. The composition to which various emulsifiers were added contained a 1.5 to 1.0 molar ratio of sucrose to methyl stearate and was as follows:

| | |
|---|---|
| Sucrose | g__ 43.1 |
| Methyl stearate | g__ 25.2 |
| Potassium carbonate | g__ 0.11 |
| Propylene glycol | ml__ 126 |

Transparent emulsions formed with potassium stearate, sodium stearate, potassium α-sulfostearate, sodium cetyl sulfate-sodium stearyl sulfate (75:25), and distearyl dimethyl ammonium chloride, all at 25.2% concentration based on total solids. A transparent emulsion also formed used sodium octadecylsulfonate at a concentration of 33.7% based on total solids.

EXAMPLE 16

Using propylene glycol monostearate in place of methyl stearate, and sodium stearate as the emulsifier, a transparent emulsion formed at 145° C. The test composition was as follows:

| | |
|---|---|
| Sucrose | g__ 43.1 |
| Propylene glycol monostearate | g__ 14.8 |
| Sodium stearate | g__ 23.1 |
| Potassium carbonate | g__ 0.11 |
| Propylene glycol | ml__ 126 |

EXAMPLE 17

Using glyceryl monostearate in place of methyl stearate, and sodium stearate as the emulsifier, a transparent emulsion formed at 145° C. The test composition was as follows:

| | |
|---|---|
| Sucrose | g__ 43.1 |
| Glyceryl monostearate | g__ 15.1 |
| Sodium stearate | g__ 23.1 |
| Potassium carbonate | g__ 0.11 |
| Propylene glycol | ml__ 126 |

EXAMPLE 18

Transparent emulsions were obtained when 1,3-butylene glycol was substituted for propylene glycol. Sodium stearate, sodium octadecyl sulfonate, and distearyl dimethyl ammonium chloride were employed as emulsifying agents in separate experiments. The test compositions were as follows:

| | |
|---|---|
| Sucrose | g__ 43.1 |
| Methyl stearate | g__ 25.2 |
| Emulsifying agent | g__ 23.1 |
| Potassium carbonate | g__ 0.11 |
| 1,3-butylene glycol | ml__ 126 |

EXAMPLE 19

A transparent emulsion was obtained when ethylene glycol was substituted for propylene glycol, using sodium stearate as the emulsifying agent. The composition was as follows:

| | |
|---|---|
| Sucrose | g__ 43.1 |
| Methyl stearate | g__ 25.2 |
| Sodium stearate | g__ 23.1 |
| Potassium carbonate | g__ 0.11 |
| Ethylene glycol | ml__ 126 |

EXAMPLE 20

A transparent emulsion was obtained when 1,3-propanediol was substituted for propylene glycol, using sodium stearate as the emulsifying agent. The composition was as follows:

| | |
|---|---|
| Sucrose | g__ 43.1 |
| Methyl stearate | g__ 25.2 |
| Sodium stearate | g__ 23.1 |
| Potassium carbonate | g__ 0.11 |
| 1,3-propanediol | ml__ 126 |

EXAMPLE 21

A transparent emulsion was obtained using a triglyceride with soap as the emulsifier. The system became transparent after stirring for 15 minutes at 150–155° C., and it remained transparent and fluid on cooling to room temperature. The composition was as follows:

| | |
|---|---|
| Sucrose | g__ 100 |
| Glyceryl trioleate | g__ 60 |
| Sodium oleate | g__ 150 |
| Potassium carbonate | g__ 7.5 |
| Propylene glycol | ml__ 500 |

EXAMPLE 22

The effect of sucrose concentration in propylene glycol on the amount of sodium stearate required to form a transparent emulsion was determined by heating mixtures in open beakers. Increments of sodium stearate were added until a transparent emulsion formed. The results, which follow, show that as the concentration of sucrose in propylene glycol was increased, more sodium stearate was required in order to form a transparent emulsion.

| | A | B | C | D |
|---|---|---|---|---|
| Methyl stearate, g | 30 | 30 | 30 | 30 |
| Propylene glycol, ml | 90 | 90 | 90 | 90 |
| Sucrose, g | 0 | 11.4 | 22.8 | 34.2 |
| Sodium stearate required, g | 6 | 10 | 16 | 20 |

EXAMPLE 23

The effect of methyl stearate content on the amount of sodium stearate required to form a transparent emulsion was determined by heating mixtures in open beakers. Increments of sodium stearate were added until a transparent emulsion formed. The results, which follow, show that as the proportion of methyl stearate was increased, larger amounts of sodium stearate were required in order to form a transparent emulsion.

| | A | B | C | D |
|---|---|---|---|---|
| Sucrose, g | 11.4 | 11.4 | 11.4 | 11.4 |
| Propylene glycol, ml | 90 | 90 | 90 | 90 |
| Methyl stearate, g | 15 | 30 | 60 | 120 |
| Sodium stearate required, g | 7 | 10 | 12 | 16 |

EXAMPLE 24

Sucrose monostearate was prepared using a 1.5 to 1.0 molar ratio of sucrose to methyl stearate with sodium hydrogenated tallow sulfate as the emulsifier. The composition of the reaction mixture was as follows:

| | | |
|---|---|---|
| Sucrose | g | 308.4 |
| Methyl stearate | g | 180 |
| Sodium hydrogenated tallow sulfate | g | 165 |
| Potassium carbonate | g | 6.5 |
| Propylene glycol | ml | 900 |

The reaction was carried out in the same manner as in Example 8. A portion of the reaction mass, after complete distillation of the propylene glycol was taken up in n-butanol. The optical rotation of the butanol solubles corresponded to $\alpha_D = +30.1$. After correction for sodium tallow sulfate dissolved in the butanol, $\alpha_D = +38.7$. This corresponds to sucrose stearate containing 1 mole of sucrose to 1.1 moles of the stearate group.

EXAMPLE 25

Sucrose stearate was prepared using sodium octadecyl sulfate as the emulsifying agent. The reaction conditions and the composition of the starting mixture were the same as in the previous example, except that 165 g. of sodium octadecyl sulfonate was used in place of an equal quantity of sodium tallow sulfate. The optical rotation of the product in n-butanol, after correcting for dissolved sodium octadecyl sulfonate corresponded to $\alpha_D = +34$. This indicates a sucrose stearate product containing 1.4 moles of the stearate group per mole of sucrose.

EXAMPLE 26

1,3-butylene glycol was employed as the sucrose solvent in place of propylene glycol. Because 1,3-butylene glycol has a higher boiling point than propylene glycol, a lower pressure was required for the distillation. Otherwise, conditions were the same as in the previous examples. The reaction mixture was as follows:

| | | |
|---|---|---|
| Sucrose | g | 308.4 |
| Methyl stearate | g | 180 |
| Potassium stearate | g | 165 |
| Potassium carbonate | g | 12 |
| 1,3-butylene glycol | ml | 900 |

The optical rotation of the product in n-butanol, after correction for dissolved soap, corresponded to $\alpha_D = +34$. This represents a 1.4 to 1.0 molar ratio of stearate to sucrose.

EXAMPLE 27

Sucrose laurate was prepared using sodium dodecylbenzene sulfonate as the emulsifier. Reaction conditions were the same as in previous examples. The starting mixture was as follows:

| | | |
|---|---|---|
| Sucrose | g | 308.4 |
| Methyl laurate | g | 129.2 |
| Sodium alkylbenzene sulfonate | g | 165 |
| Potassium carbonate | g | 12.1 |
| Propylene glycol | ml | 900 |

The product of the reaction, after correction for sodium dodecylbenzene sulfonate dissolved in the n-butanol layer, gave an optical rotation value corresponding to $\alpha_D = +38$. On this basis the sucrose ester contains 1.5 moles of the laurate group per mole of sucrose.

EXAMPLE 28

A reaction was carried out using an equal molar ratio of sucrose and methyl stearate. Otherwise, reaction conditions were the same as in previous examples. The starting mixture consisted of:

| | | |
|---|---|---|
| Sucrose | g | 205.4 |
| Methyl stearate | g | 180 |
| Sodium stearate | g | 165 |
| Potassium carbonate | g | 11 |
| Propylene glycol | ml | 900 |

After correction for soap dissolved in the n-butanol solution, the optical rotation corresponded to $\alpha_D = +34.5$, which corresponds to sucrose stearate containing a 1.3:1.0 molar ratio of stearyl groups to sucrose.

EXAMPLE 29

Sucrose esters prepared according to the previous examples are dark in color due to carmelization of sugar at the elevated temperatures. The color can be removed by seeping in cold water. Thus, the product of Example 28 was ground and immersed in water at 4° C., and the mixture was stored at 4° C. The water was decanted from the solids once each day and preplaced with fresh water. After three treatments in this manner, the product was almost white in color.

The invention in its broader aspects is not limited to the specific steps and methods described but departures may be made therefrom within the scope of the accompanying claims without departing from the principles of the invention and without sacrificing its chief advantages.

What is claimed is:

1. In an organic synthesis process for conducting a transesterification reaction between an alcohol selected from the group consisting of glycerine, sucrose and raffinose and a predominantly hydrophobic ester of a long chain fatty acid, the improvement which comprises combining the alcohol and ester reactants in the presence of a suitable emulsifying agent to form a transparent emulsion, said emulsifying agent being selected from the group consisting of ethylene oxide condensation products formed from lanolin alcohol or from 12 to 22 carbon atom fatty acids or from 12 to 22 carbon atom fatty alcohols or from 12 to 22 carbon atom fatty amines; sorbitan esters of 12 to 22 carbon atom fatty acids and their ethylene oxide derivatives; 12 to 22 carbon alkyl sulfates and phosphates; 12 to 22 carbon atom alkyl sulfonates; 12 to 22 carbon atom alkenyl sulfonates; alkylbenzene sulfonates with 8 to 18 carbon atoms in the alkyl group; surface-active quaternary ammonium compounds; and, the sodium and potassium soaps of 12 to 22 carbon atom fatty acids; and, carrying out the reaction between said reactants to form a reaction product selected from the group consisting of glyceryl, sucrose and raffinose esters of long-chain fatty acids.

2. In a process according to claim 1 wherein the alcohol is glycerine.

3. In a process according to claim 1 wherein the alcohol is sucrose.

4. In a process according to claim 1 wherein the reaction is carried out under alkaline conditions.

5. In a process according to claim 1 wherein the emulsifying agent is selected from the group consisting of alkyl benzene sulfonates with 8 to 18 carbon atoms in the alkyl group; and, sodium and potassium soaps of 12 to 22 carbon atom fatty acids.

6. In a process according to claim 1 wherein the alcohol reactant is glycerine and ester reactant is selected from the group consisting of methyl oleate.

7. In a process according to claim 1 wherein the alcohol is selected from the group consisting of sucrose and raffinose, said alcohol being dissolved in a solvent when combined with said ester reactant in the presence of said emulsifying agent to form said transparent emulsion, the emulsion being distilled to distill off the solvent and carrying out the reaction between said reactants to form the reaction product.

8. In a process according to claim 7 wherein the alcohol is sucrose and the reaction is carried out in the presence of an alkaline catalyst.

9. In a process according to claim 7 wherein the solvent is propylene glycol.

10. In a process according to claim 7 wherein the alcohol is sucrose and the ester is selected from the group consisting of methyl oleate, methyl stearate and methyl laureate to form a reaction product selected from the group consisting of sucrose stearate, sucrose oleate and sucrose laureate.

References Cited

UNITED STATES PATENTS

| | | | |
|---|---|---|---|
| 2,700,022 | 1/1955 | Clayton et al. | 260—234 |
| 2,831,856 | 4/1958 | Tucker | 260—234 |
| 2,893,990 | 7/1959 | Hass et al. | 260—234 |
| 3,054,789 | 9/1962 | D'Amato | 260—234 |

LEWIS GOTTS, Primary Examiner

J. R. BROWN, Assistant Examiner

U.S. Cl. X.R.

260—410.7

UNITED STATES PATENT OFFICE
CERTIFICATE OF CORRECTION

Patent No. 3,480,616                                November 25, 1969

Lloyd I. Osipow et al.

It is certified that error appears in the above identified patent and that said Letters Patent are hereby corrected as shown below:

Column 1, line 35, "disterate" should read -- distearate --. Column 3, line 15, cancel "able"; line 30, "glycereine" should read -- glycerine --. Columns 5 and 6, Table I, Example 5C under the heading REACTION CONDITIONS TEMPERATURE AND VACUUM, "110° C./mmg" should read -- 110° C./5mm --. Column 8, line 40, "The" shou read -- the --; line 49, "(0.12 mole)" should read -- (0.13 mole) --. Column 12, line 23, "preplaced" should read -- replaced --.

Signed and sealed this 26th day of May 1970.

(SEAL)
Attest:

Edward M. Fletcher, Jr.                              WILLIAM E. SCHUYLER, JR.
Attesting Officer                                      Commissioner of Patents